United States Patent
Hagan (10) Patent No.: US 9,439,235 B2
(45) Date of Patent: Sep. 6, 2016

(54) WIRELESS ACCESS POINT ALLOCATION AND TRANSFER

(71) Applicant: Chris Hagan, Halifax (GB)

(72) Inventor: Chris Hagan, Halifax (GB)

( * ) Notice: Subject to any disclaimer, the term of this patent is extended or adjusted under 35 U.S.C. 154(b) by 0 days.

(21) Appl. No.: 14/710,860

(22) Filed: May 13, 2015

(65) Prior Publication Data
US 2016/0050710 A1 Feb. 18, 2016

(30) Foreign Application Priority Data

Jun. 13, 2014 (GB) .................................. 1410623.1
Oct. 27, 2014 (GB) .................................. 1419041.7

(51) Int. Cl.
| | | |
|---|---|---|
| H04W 4/00 | (2009.01) | |
| H04W 76/04 | (2009.01) | |
| H04L 29/06 | (2006.01) | |
| H04W 12/06 | (2009.01) | |
| H04L 29/08 | (2006.01) | |
| H04W 12/04 | (2009.01) | |
| H04W 36/08 | (2009.01) | |
| H04W 84/12 | (2009.01) | |
| H04W 12/08 | (2009.01) | |

(52) U.S. Cl.
CPC .......... *H04W 76/04* (2013.01); *H04L 63/0846* (2013.01); *H04L 67/1002* (2013.01); *H04W 12/04* (2013.01); *H04W 12/06* (2013.01); *H04W 12/08* (2013.01); *H04W 36/08* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2004/0103282 | A1* | 5/2004 | Meier | G06Q 20/3674 713/171 |
| 2007/0206537 | A1* | 9/2007 | Cam-Winget | H04L 63/162 370/331 |
| 2008/0045180 | A1* | 2/2008 | Yang | H04W 12/04 455/411 |
| 2008/0220741 | A1 | 9/2008 | Hung | |
| 2010/0146614 | A1 | 6/2010 | Savoor | |
| 2012/0069825 | A1* | 3/2012 | Ode | H04B 7/024 370/336 |
| 2012/0317619 | A1 | 12/2012 | Dattagupta et al. | |
| 2013/0129091 | A1* | 5/2013 | Kang | H04W 12/04 380/270 |
| 2013/0246784 | A1* | 9/2013 | Zhang | H04L 63/0464 713/153 |

(Continued)

FOREIGN PATENT DOCUMENTS

GB    2407940 A    11/2005

OTHER PUBLICATIONS

UKIPO, Section 17 Search and Examination Report for GB1419041.7, Report issued Mar. 5, 2015.

*Primary Examiner* — Otis L Thompson, Jr.
(74) *Attorney, Agent, or Firm* — Ditthavong & Steiner, P.C.

(57) ABSTRACT

A network system includes a master wireless access point (mAP) connected to one or more slave access points (sAPs), the mAP configured to configure the wireless access password of the sAP(s) and including an open user interface wirelessly accessible by a wireless device, a security gateway and a secure user interface wirelessly accessible by the wireless device. The wireless device connects to the mAP via the open user interface and exchanges security credentials to bypass the security gateway to gain access to the secure user interface. The wireless device is connected to the secure user interface, the mAP is configured to: configure an SSID and/or wireless access password for a sAP and to share the SSID and/or wireless access password with the wireless device, whereupon, the wireless device disconnects from the mAP and re-connects to the network via the sAP using the wireless access password configured by the mAP.

20 Claims, 4 Drawing Sheets

(56) References Cited

U.S. PATENT DOCUMENTS

| | | | |
|---|---|---|---|
| 2013/0336486 A1* | 12/2013 | Agiwal | H04W 12/04 380/270 |
| 2015/0038084 A1* | 2/2015 | Dahan | H04W 84/18 455/41.2 |
| 2015/0319042 A1* | 11/2015 | PalChaudhuri | H04L 12/4641 370/395.53 |
| 2015/0319657 A1* | 11/2015 | Fan | H04W 36/08 370/332 |
| 2016/0036700 A1* | 2/2016 | Unnimadhavan | H04L 45/74 370/392 |

* cited by examiner

| Device 20 | sAP1 182 | | | sAP2 184 | | | sAP3 186 | | |
|---|---|---|---|---|---|---|---|---|---|
| | SSID | PW | TO 88 | SSID | PW | TO 88 | SSID | PW | TO 88 |
| 1 | cxyz | abc | 20s | | | | | | |
| 2 | | | | fjgr | xyz | 20s | | | |
| 3 | cxyz | abc | 2s | | | | | | |
| n | | | | | | | ... | ... | ... |

FIGURE 4

WIRELESS ACCESS POINT ALLOCATION AND TRANSFER

CROSS-REFERENCE TO RELATED APPLICATIONS

This application claims the benefit of GB Patent Application 1410623.1, filed Jun. 13, 2014, and the benefit of GB Patent Application 1419041.7, filed Oct. 26, 2014, the entire disclosures of which are each hereby incorporated herein by reference.

FIELD

This invention relates to allocating wireless devices to, and transferring wireless devices between, multiple wireless access points. The invention may be particularly useful in managing wireless connections between multiple users across multiple access points, and in particular, in relation to download booths or Wi-Fi networks located in high density areas.

BACKGROUND

It is commonplace nowadays for people to use public Wi-Fi and wireless networks to connect to data networks, such as the internet, or local servers. This is accomplished by the provision of a wireless network adapter (most commonly, a Wi-Fi adapter) installed on a device, such as a mobile telephone, laptop computer, tablet PC etc., which connects to the LAN or WAN via an access point. The data transfer speed of the wireless connection is limited by a number of factors, which ultimately determine the download and upload speed of data from, and to, the LAN or WAN, respectively.

Ultimately, the data transfer speed is limited by the speed of the network, for example whether it is a 10 Mbps, 100 Mbps or 1000 Mbps (or greater) network and this is determined by the speed of the switches, routers and other devices connected to the network. The network is connected to a wireless access point (hereinafter an "AP"), which bridges the hard-wired LAN to the wireless LAN (WLAN) and wireless devices can thus connect to the AP to establish a connection to the LAN.

The speed of the WLAN is determined by a number of factors, such as the distance between the wireless device and the AP (signal strength diminishing with distance), the physical layout of the environment (e.g. the location of attenuating and/or reflecting elements, such as walls, floors and ceilings), and the number of concurrently connected users. Whilst the former factors that determine the maximum possible download speed are largely outside the WLAN provider's control, the number of concurrent users is, in many cases, within the WLAN provider's control.

The number of concurrent connections to a WLAN AP is important because the maximum available bandwidth, i.e. the bandwidth at the AP-LAN connection, and the bandwidth of AP, must effectively be shared between the concurrent users. Thus, a single user may be able to make full use of the available bandwidth, but when another user connects to the same AP, the bandwidth for each user is effectively halved. In practice this is not always the case because data upload and download for concurrent users is not necessarily simultaneous, i.e. the bandwidth can be striped such that each user attains the maximum bandwidth, albeit at different times. However, when many users connect to a single AP, the bandwidth, and hence the data download/upload speeds can be adversely affected.

APs are nowadays available that have multi-in, multi-out (MIMO) capabilities, and these APs often have multiple antennae, which enable some of the aforementioned problems to be ameliorated. However, up-scaling existing MIMO APs is difficult (there is currently a limit to the number of MIMO connections that can be made to a single MIMO AP), and installing multiple APs in a single location can be problematic also.

The reason for this is that to establish a WLAN connection, a user typically needs to pass a security protocol, such as WPA, WPS and WEP before a connection to the WLAN can be established which usually requires a user to correctly enter a password corresponding to the unique identification (SSID) of the AP to gain access to it. Specifically, each AP is usually given a SSID, and its own password, and this is a sensible precaution to prevent data collisions and DNS errors on the network. This is also sensible where (as the case most often); connections to the WLAN are established on the basis of an IP address of the AP, rather than on the basis of its truly unique MAC.

For the sake of convenience, AP connection credentials (SSID and password) are often stored on users' devices for a period of time so that when the device comes back within range of an AP to which it has previously successfully connected, a WLAN connection can be initiated automatically—without any user intervention.

In order to scale-up the available bandwidth, it is nowadays becoming more common to install multiple APs in heavily-used WLAN environments.

SUMMARY

However, where multiple APs are available, the returning user may not reconnect to the same AP, in which case, the SSID and password credentials will not match. As previously stated, providing multiple APs with identical SSIDs and passwords is undesirable, and so a user may need to re-connect using fresh credentials. Doing this a few times may be acceptable, but where a great many APs are present in a particular area, the user will quickly become annoyed with having to obtain and input AP credentials corresponding to each new AP visited in a the same area.

This invention aims to provide a solution to one or more of the above problems. According to the invention, there is provided a network architecture comprising a master wireless access point (mAP) operatively connected to one or more slave access points (sAPs), the mAP being configured, in use, to configure the wireless access password of the or each sAP and comprising an open user interface wirelessly accessible by a wireless device, a security gateway and a secure user interface wirelessly accessible by the wireless device, wherein, in use, the wireless device connects to the mAP via the open user interface and exchanges security credentials to bypass the security gateway to gain access to the secure user interface, and wherein, when the wireless device is connected to the secure user interface, the mAP is configured to: configure a wireless access password for a sAP and to share the wireless access password with the wireless device, whereupon, the wireless device disconnects from the mAP and re-connects to the network via the sAP using the wireless access password configured by the mAP.

The invention thus enables a user to make a connection to an open wireless AP, without initially having to exchange security credentials. The mAP may be configured to permit limited amounts of upload/download from the network via the open wireless connection, for example, access to a file server located on the network containing a database and/or summaries and/or previews of content (e.g. movies and music) on the server. If a user then decides that he/she wishes to connect to the server, for example to download content from it, rather than serving the data over a single AP (in this case, the mAP), the mAP is able to seamlessly connect the wireless device to one or more of the sAPs in the vicinity. This is accomplished by requesting the wireless device user to enter security credentials, such as a username and password, whereupon the mAP will configure one of the sAPs with a given wireless access password and share this with the wireless device. The wireless device is then able to connect to the network, via the sAP, using the wireless access password just given to it by the mAP. This frees-up the mAP to handle subsequent access requests from other wireless devices.

It will be appreciated that the invention could comprise any number of sAPs, and in heavily populated areas, such as hotel lobbies, cinema foyers, shopping mall restaurant areas, airport lounges, coffee shops, etc., a great many sAPs may be provided to enable the wireless bandwidth of each sAP to be shared between as few as possible concurrent users (wireless devices). Such a configuration suitably improves the individual and collective user experience of users with wireless devices in the area.

Suitably, the exchange of passwords is effected using an application loaded on and/or executed in the wireless device. The application may comprise a web browser plugin, or it may be a standalone application which is downloadable from a server connected to the mAP via the open wireless connection. Thus, users may be able to conveniently hop from the mAP to any one of the sAPs invisibly, i.e. without knowing when or how it occurs.

The mAP is suitably configured to allocate the wireless access passwords of the sAPs dynamically. This can be accomplished by network technologies, such as uPNP, whereby the mAP is able to access and re-configure the OS of the sAPs to reset the passwords on a regular or on an ad-hoc basis.

To improve security, and to avoid users being able to return to the location and connect to one of the sAPs without first going through the mAP, the mAP is suitably configured to assign a time-out for the wireless access passwords of the sAPs. The time-out parameter may be a fixed duration, e.g. re-set every 10 minutes, or it may be configured dynamically. Dynamic configuration of the password time-out may be accomplished by monitoring the number of concurrent wireless connections to a particular sAP and resetting the wireless password when the number of concurrent users drops to zero (i.e. when all users have disconnected). Additionally or alternatively, the time-out may be configured to coincide with a particular event, such that the end of a particular downloads (actual or estimated).

Suitably, the mAP comprises a device allocation table, which contains a record of wireless devices, the sAPs they have been connected to and the wireless access password assigned to each session. Maintaining the device allocation table is useful because it enable the mAP to determine which sAPs are in use at any given time, and allows it to allocate new connections to sAPs with fewer, or no, concurrent open sessions. By reducing the number of concurrent sessions at each sAP, the password reset parameter can potentially be shortened, thus reducing the likelihood of a user being able to return and re-connect to a sAP without first having to connect via the mAP.

Suitably, the mAP is configured to assign random passwords to the sAPs, which also reduces the likelihood of unauthorised access to the network. Additionally or alternatively, the mAP may be configured to assign random SSIDs to the sAPs, which may also inhibit a retuning user from being able to identify, and attempt to connect to, a previously connected-to sAP.

The mAP is suitably configured to assign wireless devices to particular sAPs on the basis of one or more selection criteria.

The selection criteria may be: the sAP with the lowest number of concurrent open sessions. This reduces the number of users per AP, thereby improving each user's individual and collective bandwidth.

The selection criteria may be: the sAP with the fastest connection speed to the wireless device. This may be determined by transferring a data packet of a known size from a number of available sAPs to the wireless device, and timing the length of time it takes to complete the download: the shortest download speed corresponding to the highest data rate. This arrangement suitably improves the user's experience because the actual download speed (rather than the theoretical download speed, which may be a built-in throttle setting of the 801 standard) from the sAP to the wireless device is maximised.

The invention may be implemented in a public area, or in a specific download booth, which may be located in a public area.

BRIEF DESCRIPTION OF THE DRAWINGS

A preferred embodiment of the invention shall now be described, by way of example only, with reference to the accompanying drawings in which.

DETAILED DESCRIPTION

Figure 1:
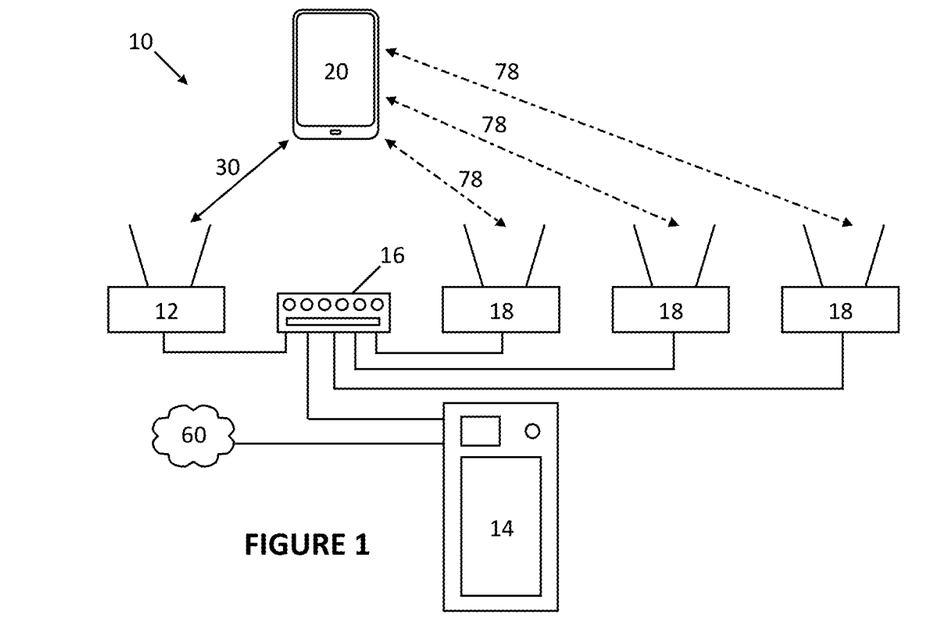
FIG. 1 is a schematic view of a network in accordance with the invention.

In FIG. 1, a network 10 comprises a master access point (mAP) 12 connected to a server 14, via a network switch or hub 16. Several slave access points (sAPs) 18 are connected to the network 10, via the switch 16. A wireless device 20 connects 30 to the network 10, and server 14, initially via the mAP 12 and then 78 via one of the sAPs 18.

The network 10 of FIG. 1 is suitably provided in a public area, such as a shopping mall, restaurant area, a hotel lobby, an airport waiting area or a cinema lobby—any area where multiple users 22 might wish to connect their respective wireless devices 20 to the network 10.

Figure 2:
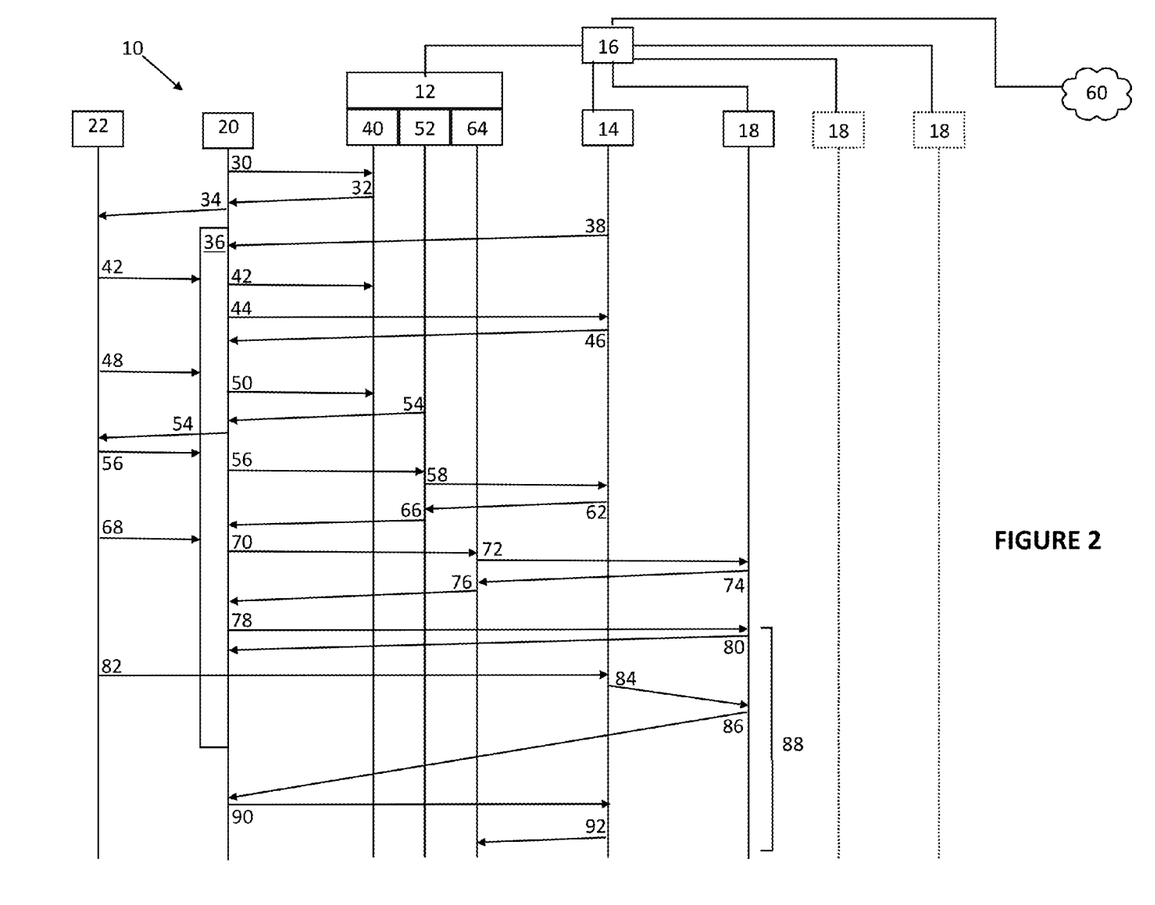
FIG. 2 is a diagram showing the connection of a wireless device to the network of FIG. 1.

Referring now to FIG. 2, which shows the network elements of the invention and the series of actions with the vertical direction from top to bottom representing time, a user 22 enters an area containing the network and his/her wireless device automatically detects 30 the presence of the mAP 12 and the mAP 12 responds 32. The wireless device 20 is configured to signify 34 the connection 30, 32 to the user 22, for example, via an on-screen display or an audible tone.

The user 22 can then choose to initiate a connection to the mAP 12 and an application is loaded 36 on the wireless device 20, which may be a browser plug-in or a dedicated application loaded on the device 20. Where a dedicated application 36 is required, but the wireless device 20 does not have this installed (as determined by the connection handshake procedure 30, 32), the user 22 can be prompted to download the application 38, from the server 14, via an open access connection 40 of the mAP 12.

Thus, the wireless device 20 is able to initiate 42 and sustain an open connection to the open access connection 40 of the mAP 12. The user 22 is then able to interrogate 44 the server 14, for example, via a web browser interface, or a portal of the application, to see whether there is any content on the server 14 that he/she may wish to download. The server 14 sends 46 a list of content that the user 22 is able to browse.

Upon making a selection 48, by interfacing with the application 36 or web browser on the wireless device 20, the selection request is passed 50 to the mAP 12 whereupon a security procedure is initiated. The content on the server 14 may be pay-per-view, or in some other way restricted, and so the mAP comprises a security gateway 52 that prompts 54 the user 22 for a username and password. The user 22 then enters his/her credentials 56 and the mAP 12 checks 58 these against a set of stored credentials either on the server 14, or elsewhere on the internet 60. Upon verification of the user credentials 62, the user's device 20 is connected to a secure access area 64 of the mAP 12 and this is verified with a "connection successful" message 66 sent back to the user's wireless device 20.

The user 22 can then interact with the app or web interface on his/her wireless device 20 to make one or more selections 68 from the available content on the server 14, and these selections are passed 70 to the secure area 64 of the mAP 12.

The mAP then allocates the wireless device 20 to a particular sAP 18, and sends a configuration message 72 to the sAP 18, which re-sets the wireless access password of the sAP 18, e.g. using uPNP, to a random value and which includes a timeout parameter 88. The timeout parameter 88 is calculated by dividing the total size of the requested download 70 by the download speed, and by adding a safety factor (multiplier). Thus, the wireless access password of the sAP 18 is temporarily reset for a known length of time 88, and the temporary random password and timeout are stored on the mAP 12. The sAP 18 confirms the parameters 74 and the parameters 74 are then transferred 76 to the wireless device 22.

The application or web browser plugin 36 of the wireless device 20 then terminates the connection with the mAP 12 and establishes a new connection 78 with the sAP 18 using the SSID and password 76 relayed in the previous step and the sAP 18 confirms 80.

The user's device 20 then then able to initiate a download 82 and data is then transferred 84 from the server 14 to the sAP 18 and then 86 from the sAP 18 to the wireless device 20 over the temporary wireless connection between the wireless device 20 and the sAP 18.

Meanwhile, the sAP is configured to timeout the connection 78, 80 after the pre-allocated timeout interval 88, and upon completion of the download 86 to the wireless device (confirmed by a confirmation message 90, the sAP times-out the connection 78, 80, thereby freeing-up the sAP for a subsequent, or other concurrent users.

If, on the other hand, the timeout period 88 elapses prior to the sAP 18 receiving the completion message 90, the sAP can poll 92 the mAP 12 for a temporary timeout extension and this can be allowed or denied, depending on the configuration of the server 14, the mAP 12 or other factors.

Figure 3:
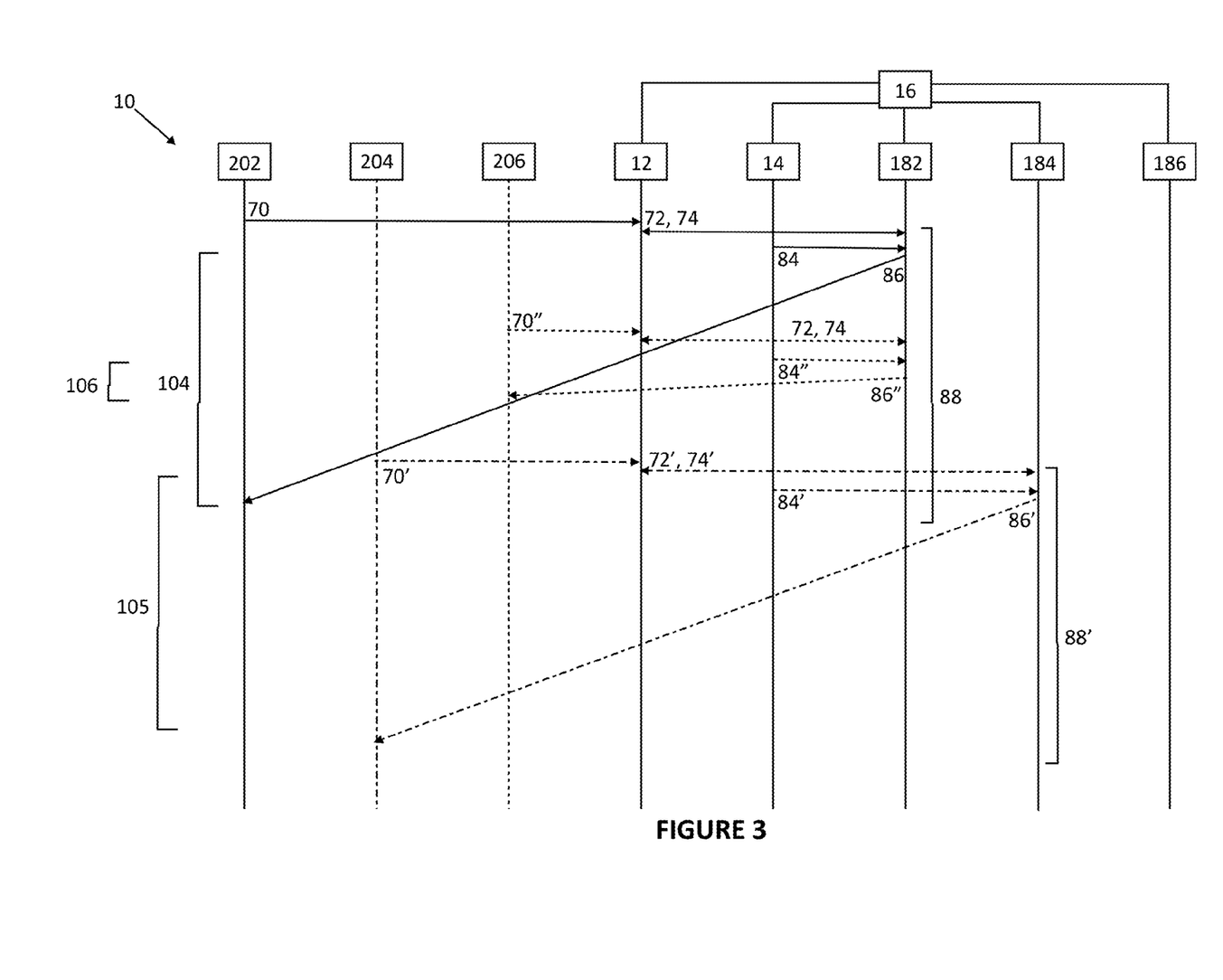
FIG. 3 is a simplified version of FIG. 2 showing the connection of several concurrent wireless devices to the network of FIG. 1.

FIG. 3 shows, schematically, how the mAP 12 can allocate different wireless devices 202, 202, 204 to different sAPs 182, 184, 186 depending on the number of concurrent connections or estimated download times.

In FIG. 3, a first wireless device 202 establishes a connection 72, 74 with a first sAP 182 and begins a download 84, 86. The first sAP 182 is preconfigured with a temporary password for the connection and has a timeout 88 corresponding to an estimated download time 104, as previously described.

A second user then attempts 82' to download content from the server 14, in a manner previously described, but the estimated duration 105 of the download 86' exceeds the remaining timeout 88 of the first sAP 182. Thus, the mAP 12 assigns the second device 204 to a second sAP 184 with its own unique SSID and password, and its own timeout parameter 88'. Thus, the second device 204 is able to benefit from un-shared bandwidth of the second sAP 184, and is not timed-out by the first sAP 182.

Meanwhile, a third wireless device 206 attempts to download 86" a relatively small file from the server 14. In this case, the mAP 12 determines that: 1) the size of the download 84", 86" is so small as to no adversely affect the first download 84, 86; 2) that the estimated duration 106 of the download will "fit" within the remaining timeout 88 of the first sAP 182 and 3) that it is not worth powering-up a third sAP 186 to serve the download. Thus, the mAP assigns the third wireless device 206 as a concurrent connection on the first sAP 182 and completes the download by duplicating the security credentials 72, 74 supplied to the first wireless device 202 to the third wireless device 206.

It will be appreciated that where the number of concurrent or sequential users is high, and/or where the number of sAPs is high, there will be benefits to the mAP 12 keeping track of which devices are allocated to which sAPs, what the temporary passwords are, and when the respective timeouts are going to occur, so that fresh password scan be re-set or extended, as need be. This is conveniently achieved by a device allocation table, such as that illustrated schematically, and in a very simplified form, in FIG. 4 of the drawings.

Figure 4:
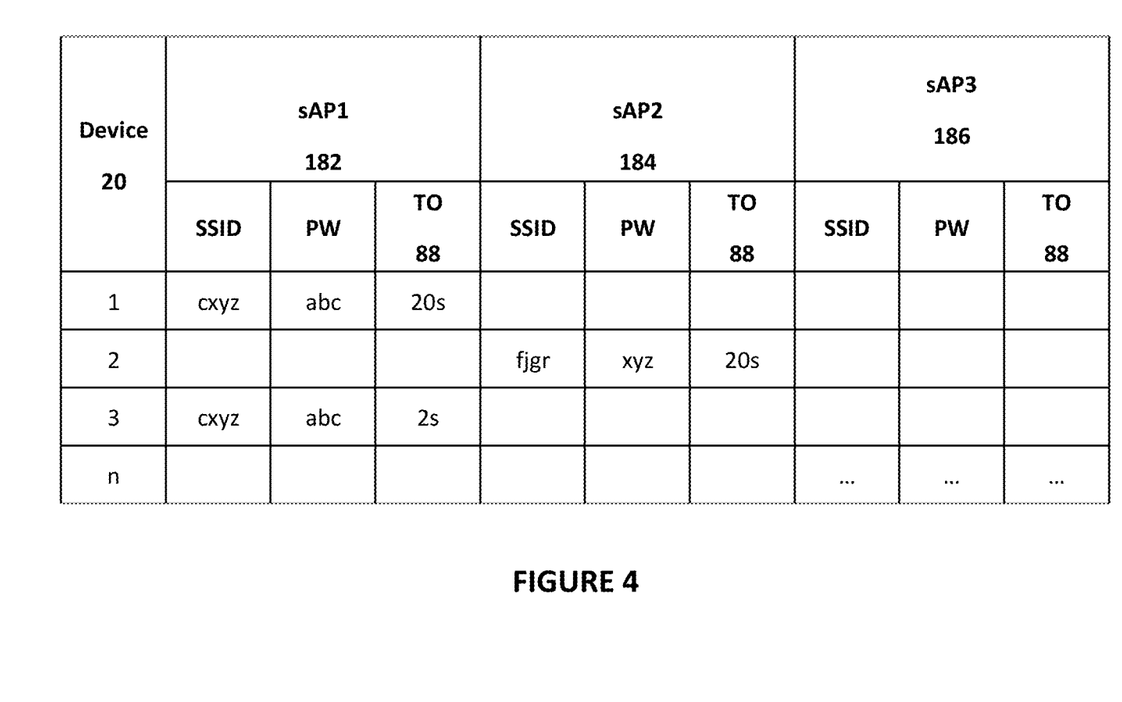
FIG. 4 is a schematic device allocation table according to the invention.

The device allocation table 300 comprises a first column listing all of the concurrently connected wireless devices 20, whether they are connected to the open 40 or secure 64 interface of the mAP 16, to which sAP 18 each device is connected, the temporary random password 302 (and/or SSID 304) for the respective sAP 18 and the time out time 88 for each sAP 18. Thus, the mAP 16 is able to track connections and to dynamically allocate different devices to different sAPs on-the-fly. Further, if the device allocation table indicates a fault (for example, a hung connection indicated by repeated time out extension requests 92), the mAP can re-assign different devices to different sAPs on-the-fly to isolate bottlenecks and/or to improve individual or collective performance.

The invention is not restricted to the details of the foregoing embodiments, which are merely exemplary of the invention.

For example, it is envisaged that any of the sAPs may also be able to act as mAPs to handle the allocation of devices 20 to any other of the sAPs. Such a configuration may be particularly useful in large public areas, for example airports, where a user may walk from a departure lounge to a boarding gate, which may be several hundred meters apart, in which case any connection to an sAP in the departure lounge would be disconnected by the time the user reaches the boarding gate (in this example, although the same may be true for any large building or space). Thus, if a user is part-way through a download before moving around, the mAP may be configured to hop the user from one sAP to another during that journey. This could particularly be facilitated by the provision of a download speed estimator system, which broadcasts a data file of a known size from all of the sAPs, each data file having a unique identifier. The device 20, an application 36 executed in the device 20, or the system 10, could time the downloads from each of the sAPs and determine which particular sAP provides the optimum connection speed, and thus the user's connection could be hopped from one sAP to another, either between downloads, or mid-download, to benefit from improved connection speed or bandwidth from a different sAP. Similarly, if the device 20, or application 36 determines that the download speed is reducing undesirably, the device 20 or application 36 may broadcast a "request to hop" command to the mAP, whereupon a better sAP could be allocated, on demand ("better" being determined, in one embodiment, on the basis of the measured instantaneous download speeds from other sAPs in-range of the device 20). The advantage of determining the connection speed by the app 36 or device 20, rather than centrally on the network, is that it reduces system overhead, and avoids the system 10 having to unnecessarily monitor connection speeds for static users. In other words, the system 10 only has to consider hopping a device from one sAP to another on-demand, as opposed to continuously, and inevitably, redundantly.

The following statements are not the claims, but relate to various aspects of the invention:

Statement 1: A network system comprising a master wireless access point (mAP) operatively connected to one or more slave access points (sAPs), the mAP being configured, in use, to configure the wireless access password of the or each sAP and comprising an open user interface wirelessly accessible by a wireless device, a security gateway and a secure user interface wirelessly accessible by the wireless device, wherein, in use, the wireless device connects to the mAP via the open user interface and exchanges security credentials to bypass the security gateway to gain access to the secure user interface, and wherein, when the wireless device is connected to the secure user interface, the mAP is configured to: configure an SSID and/or a wireless access password for a sAP and to share the SSID and/or wireless access password with the wireless device, whereupon, the wireless device disconnects from the mAP and re-connects to the network via the sAP using the wireless access password configured by the mAP.

Statement 2: The network of statement 1, wherein the open user interface is not password- or otherwise security-protected.

Statement 3: The system of statement 1 or statement 2, wherein the mAP is configured to permit limited amounts of upload/download from the network via the open wireless connection.

Statement 4: The system of statement 3, wherein the mAP is configured to permit access to a file server located on the network, the server containing a database and/or summaries and/or previews of content stored on the server.

Statement 5: The system of any preceding statement, wherein the mAP is configured to connect the wireless device to one or more of the sAPs by requesting a user of the wireless device to enter security credentials, whereupon the mAP configures one of the sAPs with a given wireless access password and shares this with the wireless device such that the wireless device is able to connect to the network, via the sAP, using the wireless access password just given to it by the mAP.

Statement 6: The system of any preceding statement comprising a plurality of sAPs, wherein the network is configured to share the wireless bandwidth of each sAP between as few as possible concurrent wireless devices.

Statement 7: The system of any preceding statement, wherein the or each wireless device comprises an application configured to exchange passwords between the wireless device and the mAP and sAP.

Statement 8: The system of statement 7, wherein the application comprises a web browser plugin or a standalone application executed in the wireless device.

Statement 9: The system of statement 7 or statement 8, further comprising a server operatively connected to the mAP, wherein the application is downloadable from the server via the mAP on the open wireless connection.

Statement 10: The system of any preceding statement, wherein the mAP is configured to allocate the SSIDs and/or wireless access passwords of the sAPs dynamically.

Statement 11: The system of statement 10, wherein the password allocation is accomplished using uPNP or other similar protocols whereby the mAP is able to access and re-configure the OS of the sAPs to reset the SSIDs or passwords.

Statement 12: The system of any preceding statement, wherein the mAP is configured to assign a time-out for the wireless access passwords and/or SSIDs of the sAPs.

Statement 13: The system of statement 12, wherein the time-out parameter is of a fixed duration.

Statement 14: The system of statement 12, wherein the time-out parameter is configured dynamically by monitoring the number of concurrent wireless connections to a particular sAP and resetting the wireless password when the number of concurrent users drops to zero.

Statement 15: The system of statement 12, wherein the time-out parameter is configured dynamically by being configured to coincide with the actual or estimated end time of a download.

Statement 16: The system of any preceding statement, wherein the mAP comprises a device allocation table containing a record of wireless devices, the sAPs they have been connected to and the wireless access password assigned to each session.

Statement 17: The system of any preceding statement, when the mAP is configured to assign random passwords to the sAPs.

Statement 18: The system of any preceding statement, when the mAP is configured to assign random SSIDs to the sAPs.

Statement 19: The system of any preceding statement, wherein the mAP is configured to assign newly-joined wireless devices to particular sAPs having the lowest number of concurrent open sessions.

Statement 20: The system of any preceding statement, wherein the mAP is configured to assign newly-joined wireless devices to particular sAPs with the fastest connection speeds to the wireless device.

Statement 21: The system of statement 20, wherein the fastest connection speed is determined by transferring a data packet of a known size from a number of available sAPs to the wireless device, and timing the length of time it takes to complete the download: the shortest download speed corresponding to the highest data rate.

Statement 22: The system of any preceding statement comprising: a master access point (mAP) connected to a server via a network switch or hub and a plurality of slave access points (sAPs) connected to the network, via the switch or hub; and a wireless device operatively connectable to the network and server, initially via the mAP and then via one of the sAPs.

Statement 23: A method of operating the system of any preceding statement comprising the steps of: the wireless device automatically detecting the presence of the mAP; the mAP responding to the detection; and the wireless device signifying the connection to a user via an on-screen display or an audible tone.

Statement 24: The method of statement 23, wherein upon making the connection, the wireless device downloading an application from the server via the open access connection of the mAP.

Statement 25: The method of statement 23 or statement 24, further comprising the server sending to the wireless device a content list representing content on the server.

Statement 26: The method of statement 25, further comprising the steps of a user making a selection from the content list, the application passing the selection to the mAP initiating a security procedure.

Statement 27: The method of statement 26, wherein the security procedure comprises the user and mAP exchanging security credentials and the mAP checking the security credentials against a set of stored credentials.

Statement 28: The method of statement 27, wherein upon verification of the user credentials, the user's device is connected to a secure access area of the mAP.

Statement 29: The method of statement 28, further comprising the steps of: a user interacting with the application to make one or more selections from the content list; the selection or selections being passed to the secure area of the mAP; the mAP allocating the wireless device to a particular sAP; the mAP sending a configuration message to the sAP to re-set the SSID and/or wireless access password of the sAP; exchanging the SSID and the wireless access password with the application of the wireless device; automatically connecting the wireless device to the server via a wireless connection between the wireless device and the sAP; and initiating a download of the selected content from the server to the wireless device.

Statement 30: The method of statement 29, wherein the configuration message comprises a timeout parameter for the sAP-wireless device connection.

Statement 31: The method of statement 29 further comprising calculating the timeout parameter by dividing the total size of the requested download by the download speed, and by adding a multiplier.

Statement 32: The method of statement 31, wherein the download speed is calculated by the sAPs periodically polling the wireless devices with a file of a known size and timing the download of the said file to determine the actual download speed between the wireless device and a plurality of sAPs.

Statement 33: The method of statement 32, comprising allocating wireless devices to sAPs with the highest determined download speeds.

Statement 34: The method of any of statements 23 to 33, further comprising populating and maintaining a device allocation table comprising: the concurrently connected wireless devices; whether the concurrently connected wireless devices are connected to the open or secure interface of the mAP; to which sAP each wireless device is connected; the temporary password and SSID for the respective sAP; and the timeout time for each sAP's SSID and/or password.

Statement 35: A system or method substantially as hereinbefore described, with reference to, and as illustrated in, the accompanying drawings.

It will be appreciated that the details of the foregoing embodiments are exemplary of the invention and that the skilled person may be able to modify certain specifics without departing from the invention. It will also be readily apparent that whilst the invention has been described with respect to downloading data, it is equally applicable to uploading data or situations in which downloading an uploading occur concurrently and/or sequentially.

What is claimed is:

1. A network system comprising a master wireless access point (mAP) operatively connected to one or more slave access points (sAPs), the mAP being configured, in use, to configure the wireless access password of the or each sAP and comprising an open user interface wirelessly accessible by a wireless device, a security gateway and a secure user interface wirelessly accessible by the wireless device, wherein, in use, the wireless device connects to the mAP via the open user interface and exchanges security credentials to bypass the security gateway to gain access to the secure user interface, and wherein, when the wireless device is connected to the secure user interface, the mAP is configured to: configure an SSID and/or a wireless access password for a sAP and to share the SSID and/or wireless access password with the wireless device, whereupon, the wireless device disconnects from the mAP and re-connects to the network via the sAP using the wireless access password configured by the mAP.

2. The network system of claim 1, wherein the open user interface is not password- or otherwise security-protected, and wherein the mAP is configured to permit limited amounts of upload/download from the network via the open wireless connection, and wherein the mAP is configured to permit access to a file server located on the network, the server containing a database and/or summaries and/or previews of content stored on the server.

3. The network system of claim 1, wherein the mAP is configured to connect the wireless device to one or more of the sAPs by requesting a user of the wireless device to enter security credentials, whereupon the mAP configures one of the sAPs with a given wireless access password and shares this with the wireless device such that the wireless device is able to connect to the network, via the sAP, using the wireless access password just given to it by the mAP.

4. The network system of claim 1, comprising a plurality of sAPs, wherein the network is configured to share the wireless bandwidth of each sAP between as few as possible concurrent wireless devices.

5. The network system of claim 1, wherein the or each wireless device comprises an application configured to exchange passwords between the wireless device and the mAP and sAP.

6. The network system of claim 5, wherein the application comprises a web browser plugin or a standalone application executed in the wireless device.

7. The network system of claim 5, further comprising a server operatively connected to the mAP, wherein the application is downloadable from the server via the mAP on the open wireless connection.

8. The network system of claim 1, wherein the mAP is configured to allocate the SSIDs and/or wireless access passwords of the sAPs dynamically.

9. The network system of claim 8, wherein the password allocation is accomplished using uPNP or other similar protocols whereby the mAP is able to access and re-configure the OS of the sAPs to reset the SSIDs or passwords.

10. The network system of claim 1, wherein the mAP is configured to assign a time-out for the wireless access passwords and/or SSIDs of the sAPs.

11. The network system of claim 10, wherein the time-out parameter is any one or more of the group comprising: of a fixed duration; configured dynamically by monitoring the number of concurrent wireless connections to a particular sAP and resetting the wireless password when the number of concurrent users drops to zero; and configured dynamically by being configured to coincide with the actual or estimated end time of a download.

12. The network system of claim 1, wherein the mAP comprises a device allocation table containing a record of wireless devices, the sAPs they have been connected to and the wireless access password assigned to each session.

13. The network system of claim 1, when the mAP is configured to assign random passwords to the sAPs.

14. The network system of claim 1, when the mAP is configured to assign random SSIDs to the sAPs.

15. The network system of claim 1, wherein the mAP is configured to assign newly-joined wireless devices to particular sAPs having the lowest number of concurrent open sessions.

16. The network system of claim 1, wherein the mAP is configured to assign newly-joined wireless devices to particular sAPs with the fastest connection speeds to the wireless device.

17. The network system of claim 16, wherein the fastest connection speed is determined by transferring a data packet of a known size from a number of available sAPs to the wireless device, and timing the length of time it takes to complete the download: the shortest download speed corresponding to the highest data rate.

18. The network system of claim 1, comprising the master access point (mAP) connected to a server via a network switch or hub and a plurality of slave access points (sAPs) connected to the network, via the switch or hub; and a wireless device operatively connectable to the network and server, initially via the mAP and then via one of the sAPs.

19. A method of operating the network system of claim 18, comprising the step of:
the wireless device automatically detecting the presence of the mAP; the mAP responding to the detection; and the wireless device signifying the connection to a user via an on-screen display or an audible tone.

20. The method of claim 19, further comprising:
upon making the connection, the wireless device downloading an application from the server via the open access connection of the mAP;
the server sending to the wireless device a content list representing content on the server;
a user making a selection from the content list, the application passing the selection to the mAP initiating a security procedure, the security procedure comprising the user and mAP exchanging security credentials and the mAP checking the security credentials against a set of stored credentials;
upon verification of the user credentials, the user's device is connected to a secure access area of the mAP;
a user interacting with the application to make one or more selections from the content list;
the selection or selections being passed to the secure area of the mAP;
the mAP allocating the wireless device to a particular sAP;
the mAP sending a configuration message to the sAP to re-set the SSID and/or wireless access password of the sAP;
exchanging the SSID and the wireless access password with the application of the wireless device;
automatically connecting the wireless device to the server via a wireless connection between the wireless device and the sAP;
initiating a download of the selected content from the server to the wireless device; and
calculating a timeout parameter for the sAP-wireless device connection and including the timeout parameter in the configuration message, the timeout parameter being calculated by dividing the total size of the requested download by the download speed calculated by the sAPs periodically polling the wireless devices with a file of a known size and timing the download of the said file to determine the actual download speed between the wireless device and a plurality of sAPs, and by adding a multiplier, and allocating wireless devices to sAPs with the highest determined download speeds.

* * * * *